US008555854B2

(12) United States Patent
Rothbauer et al.

(10) Patent No.: US 8,555,854 B2
(45) Date of Patent: Oct. 15, 2013

(54) PISTON BOWL WITH DEFLECTING FEATURES

(75) Inventors: Rainer J. Rothbauer, San Antonio, TX (US); Charles E. Roberts, Jr., Helotes, TX (US); Thomas W. Ryan, III, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 402 days.

(21) Appl. No.: 12/767,531

(22) Filed: Apr. 26, 2010

(65) Prior Publication Data
US 2011/0259297 A1 Oct. 27, 2011

(51) Int. Cl.
*F02B 31/00* (2006.01)

(52) U.S. Cl.
USPC .................. 123/306; 123/285; 123/307

(58) Field of Classification Search
USPC ......... 123/269, 276, 279, 285, 298, 301, 306, 123/307
See application file for complete search history.

(56) References Cited

U.S. PATENT DOCUMENTS

| | | | |
|---|---|---|---|
| 2,231,392 A | 2/1941 | McCarthy | |
| 4,311,122 A * | 1/1982 | Banba et al. | 123/279 |
| 4,770,138 A | 9/1988 | Onishi | |
| 4,779,587 A * | 10/1988 | Schweinzer et al. | 123/276 |
| 4,942,804 A | 7/1990 | Matsuura et al. | |
| 5,065,715 A | 11/1991 | Evans | |
| 5,103,784 A | 4/1992 | Evans | |
| 5,121,722 A * | 6/1992 | Horiuchi | 123/276 |
| 5,136,994 A * | 8/1992 | Gale | 123/276 |
| 5,224,449 A | 7/1993 | Fukano et al. | |
| 5,329,901 A * | 7/1994 | Onishi | 123/254 |
| 5,357,924 A * | 10/1994 | Onishi | 123/276 |
| 5,535,716 A | 7/1996 | Sato et al. | |
| 5,873,344 A * | 2/1999 | Kudou et al. | 123/295 |
| 6,237,579 B1 | 5/2001 | Singh | |
| 6,336,437 B1 | 1/2002 | Baika et al. | |
| 6,601,561 B1 * | 8/2003 | Liu et al. | 123/276 |
| 6,651,612 B2 | 11/2003 | Kobayashi | |
| 6,701,875 B2 | 3/2004 | Weng et al. | |
| 6,708,666 B2 | 3/2004 | Roberts, Jr. | |
| 6,739,308 B1 * | 5/2004 | Curtis | 123/262 |
| 6,892,689 B2 | 5/2005 | Bischofberger et al. | |
| 6,955,165 B2 * | 10/2005 | Liu | 123/663 |
| 6,997,158 B1 * | 2/2006 | Liu | 123/279 |
| 7,096,848 B2 | 8/2006 | Ono et al. | |
| 7,131,418 B2 | 11/2006 | Wieland | |
| 7,318,406 B2 | 1/2008 | Yi et al. | |

(Continued)

OTHER PUBLICATIONS

U.S. Office Action, mailing date Sep. 20, 2012 issued in U.S. Appl. No. 12/763,468 (5 pgs).

(Continued)

*Primary Examiner* — John Kwon
(74) *Attorney, Agent, or Firm* — Grossman Tucker et al

(57) ABSTRACT

A piston for a direct injection engine is provided, the piston having a bowl at an upper end, the bowl forming a portion of a combustion chamber. The bowl includes an inner surface and a dome that defines a volume configured to receive a fuel-air mixture, the inner surface of the bowl and the dome each including at least one surface feature as a target for the fuel spray. The surface feature may protrude from the inner surface of the bowl or may be recessed into the inner surface. Such surface features may reduce soot and improve fuel-air mixing.

17 Claims, 11 Drawing Sheets

(56) References Cited

U.S. PATENT DOCUMENTS

| | | | |
|---|---|---|---|
| 7,441,535 B2* | 10/2008 | Yuzaki et al. | 123/276 |
| 2003/0066507 A1 | 4/2003 | Roberts, Jr. | |
| 2003/0217732 A1* | 11/2003 | Kataoka et al. | 123/276 |
| 2006/0090726 A1 | 5/2006 | Meffert et al. | |
| 2006/0201143 A1 | 9/2006 | Jacobsson et al. | |
| 2007/0163535 A1* | 7/2007 | Walter | 123/276 |
| 2009/0188481 A1 | 7/2009 | Zhu et al. | |
| 2009/0205607 A1 | 8/2009 | Levy | |
| 2010/0206263 A1* | 8/2010 | Hasegawa | 123/279 |
| 2010/0258076 A1* | 10/2010 | Eismark et al. | 123/279 |
| 2011/0146613 A1 | 6/2011 | Oxborrow et al. | |
| 2011/0253094 A1* | 10/2011 | Rothbauer et al. | 123/276 |
| 2011/0253095 A1* | 10/2011 | Rothbauer et al. | 123/276 |
| 2011/0271931 A1 | 11/2011 | Rothbauer et al. | |

OTHER PUBLICATIONS

U.S. Office Action, mailing date Jun. 6, 2013 issued in U.S. Appl. No. 12/773,344 (9 pgs).

* cited by examiner

PISTON BOWL WITH DEFLECTING FEATURES

FIELD OF THE INVENTION

The present disclosure relates to a piston and an associated method of utilizing the piston within a direct injection engine wherein one or more surface features included in the dome of the piston bowl may be configured as targets for an injected fuel spray. The deflection of the spray off surface features on the piston dome may improve the distribution of fuel along with an effect on, e.g., NOx, soot emission and/or heat release.

BACKGROUND

Modern day engines must meet ever-more stringent emission regulations while remaining as fuel efficient as possible. Such engines may be designed to meet extremely strict NOx and particulate matter regulations. The use of high levels of exhaust gas recirculation (EGR) to reduce NOx emissions may have an unfortunate side effect of increasing the emission of particulate matter (PM) or soot. There may be multiple approaches to achieve the emission targets and to reduce the particulate matter to levels which current after-treatment systems may be able to tolerate, each approach having its own advantages and disadvantages. Besides strategies like high injection pressure and late injection timing, after-treatment systems may be used to reduce both the NOx and particulate matter, but at a relatively higher initial coast for the engine/after-treatment system. This higher cost and complexity may result in a potential benefit for an in-cylinder emission reduction solution.

To meet the goals of reduced emissions and fuel efficiency, combustion chamber design may provide an opportunity to improve burn rate and fuel consumption while improving the fuel-air mixing rate so that particulate emissions may be reduced. High injection pressure systems may provide not only small droplets and more oxygen entrainment in the fuel/air mixture, but also may provide high momentum jets of fuel, which may be used to distribute the fuel to oxygen-rich regions within the combustion chamber. Due to the increased lift-off length and oxygen entrainment from high injection pressure, the burning zone may now be moved closer to the bowl wall.

Traditional combustion system development has concentrated on axial symmetric bowl shapes. The traditional piston bowl shape may serve as a starting point for improvement, however, these shapes are generally 2-dimensional (smooth surfaced).

SUMMARY

A piston for a direct injection engine, the piston comprising a bowl at an upper end, the bowl forming a portion of a combustion chamber, wherein the bowl has a centerline and an inner surface and a dome that defines a bowl volume configured to receive a fuel-air mixture, the dome having a surface that includes at least one separation feature having an edge on the dome surface for deflecting sprayed fuel, where the feature is formed as a step in the surface of the dome, the step disposed around the centerline.

In a related embodiment, the present disclosure again relates to a piston for a direct injection engine, the piston comprising a bowl at an upper end, the bowl forming a portion of a combustion chamber, wherein the bowl has a centerline and an inner surface and a dome that defines a bowl volume configured to receive a fuel-air mixture, the dome having a surface that includes at least one separation feature on said dome surface for deflecting sprayed fuel, where the feature is formed as a step in the surface of the dome, the step disposed around the centerline and wherein the dome further includes at least one additional surface feature having an edge and the additional surface feature projects from or is recessed into the dome surface and the at least one additional surface feature is a portion of a cone and includes a surface having a convex shape.

In method form, the present disclosure relates to a method of operating an internal combustion engine having at least one cylinder and a piston slidably disposed within the at least one cylinder, the method comprising moving the piston toward a top dead center position during a compression stroke and spraying a fuel and air mixture into a piston bowl recessed in said piston, wherein the bowl has a centerline and an inner surface and a dome that defines a bowl volume configured to receive a fuel-air mixture. The dome may have a surface that includes at least one separation feature on the dome surface for deflecting sprayed fuel, where the feature is formed as a step in the surface of the dome, the step disposed around the centerline, wherein the dome separation feature includes an edge portion that redirects the fuel-air mixture upon impact to provide additional fuel-air mixing.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION

Various features of the present invention will now become readily apparent to those skilled in the art from the following detailed description, wherein the invention is shown along with certain preferred embodiments. As will be realized the invention is capable of other and different embodiments, and its several details are capable of modification in various respects. Accordingly, the description is to be regarded as illustrative in nature and not as restrictive.

Today's high pressure injection systems for engines deliver a large amount of kinetic energy which can now be utilized to form a favorable distribution of fuel in the combustion chamber which may be applicable for diesel engines. The mixture distribution may now be influenced by the geometry of the spray impact zone along the inner surfaces of the piston bowl thus affecting the formation of emissions as well as heat release. In this disclosure, fuel-jet/bowl-dome interaction is employed to improve combustion characteristics. Various types of geometric features may be included on and/or around the surface of the dome of the piston bowl to enhance performance. As noted above, the deflection and separation geometries disposed on the piston dome may now improve the distribution of fuel along with an effect on, e.g., NOx formation, soot emission and/or heat release. For example, soot may be reduced as compared to those pistons that do not incorporate the features noted herein.

While the disclosure is now discussed primarily with respect to diesel engines, it is contemplated that the features of the invention would be applicable to any engine using direct injection of fuel, for instance, gasoline or natural gas. Reference to direct injection of fuel may be understood as the injection of fuel into a cylinder containing a piston where the fuel is ignited to provide piston movement.

Computational Fluid Dynamic (CFD) modeling was used to identify the various piston bowl dome surface features, particularly edges, formed in the surface of a piston bowl dome which may now be used as deflection features for the spray jet path. This then may increase air entrainment due to improved atomization and penetration of the fuel spray into the air. As noted herein, such improved entrainment herein results in a reduction in soot (particulate matter) emissions. Such reduction may also now occur without a relative increase in NOx emissions. Confirmation studies utilized a complete piston bowl geometry containing the identified surface features on the dome.

Figure 1:
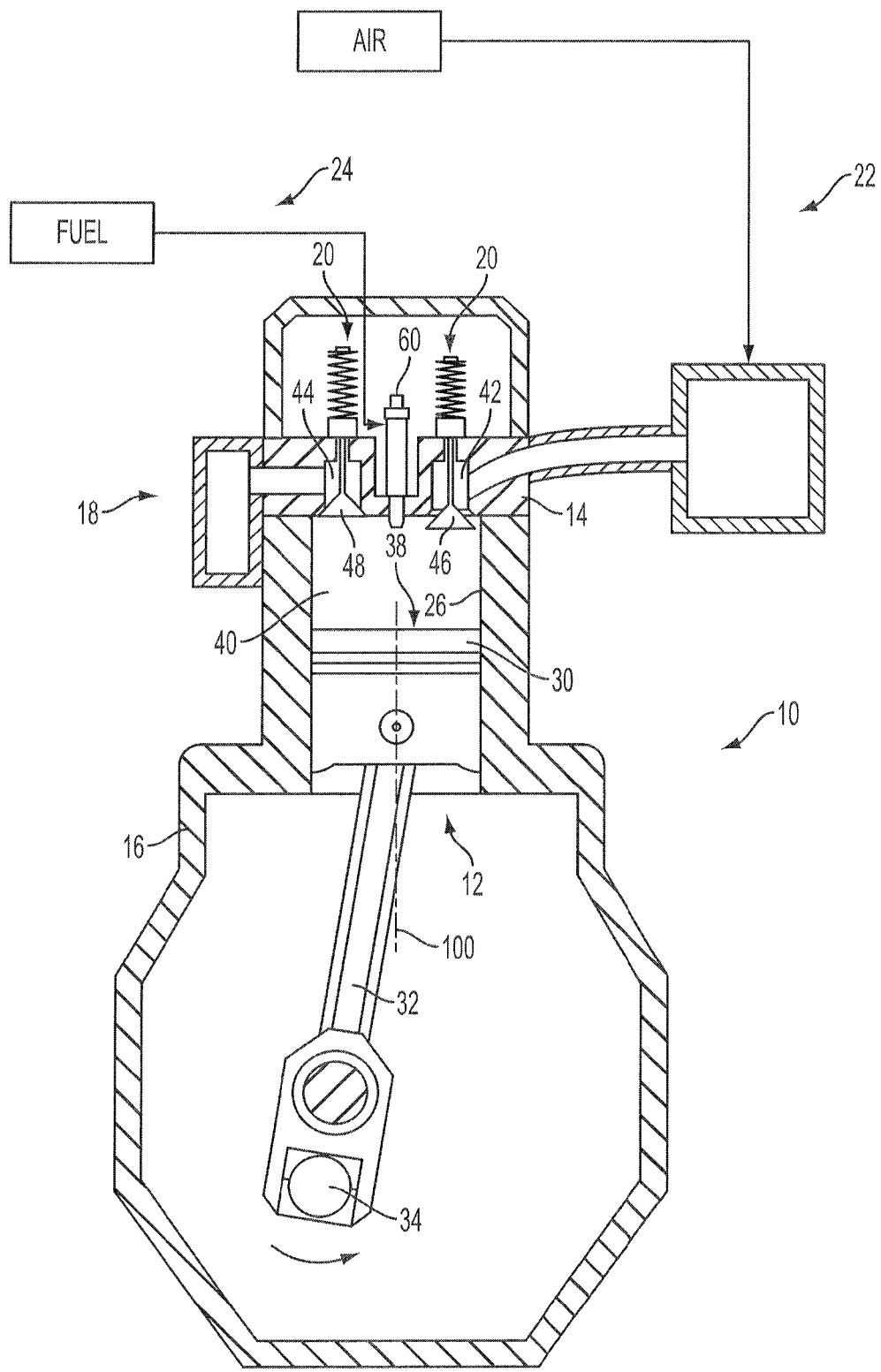
FIG. 1 is a schematic illustration of an exemplary internal combustion engine.

For reference purposes, FIG. 1 is a schematic illustration of an exemplary internal combustion engine showing one of a plurality of cylinders in sectional view. Such an internal combustion engine 10 may include a plurality of piston assemblies 12 and a cylinder head 14 associated with each piston assembly surrounded by an engine block 16, an exhaust system 18, a valve actuation system 20, an air induction system 22 and a fuel supply system 24. The piston assembly 12 may be slidably disposed within a cylinder 26. Piston assembly 12 may include a piston 30 pivotally connected to a connecting rod 32, which is pivotally connected to a crankshaft 34. A rotation of the crankshaft 34 may result in a sliding motion of piston 30 within the cylinder 26. The cylinder head 14 and end of the piston 30 form a combustion chamber 40. The combustion chamber 40 may include an intake port 42 and an exhaust port 44 and intake valve 46 and exhaust valve 48 disposed within the respective ports. At least one fuel injector 60 may be disposed within the cylinder head 14 to inject fuel into the combustion chamber at a predetermined time. Such injector may be located on the centerline 100 of the cylinder head (as shown) or may be offset from such centerline. The face 38 of piston 30 may surround a curved surface against which combustion gases may exert pressure to drive the piston downward. In the present disclosure, this curved surface may be a generally annular concave recess or bowl 50 as shown in FIG. 2 and may further include a domed surface C around the centerline 100.

"Dome" as used herein refers to the generally convex surface area that is adjacent to and relatively concentric around the central axis 100 of the piston and extends from the axis to the lowest point in the bowl, interfacing with the bowl inner wall.

Figure 2:
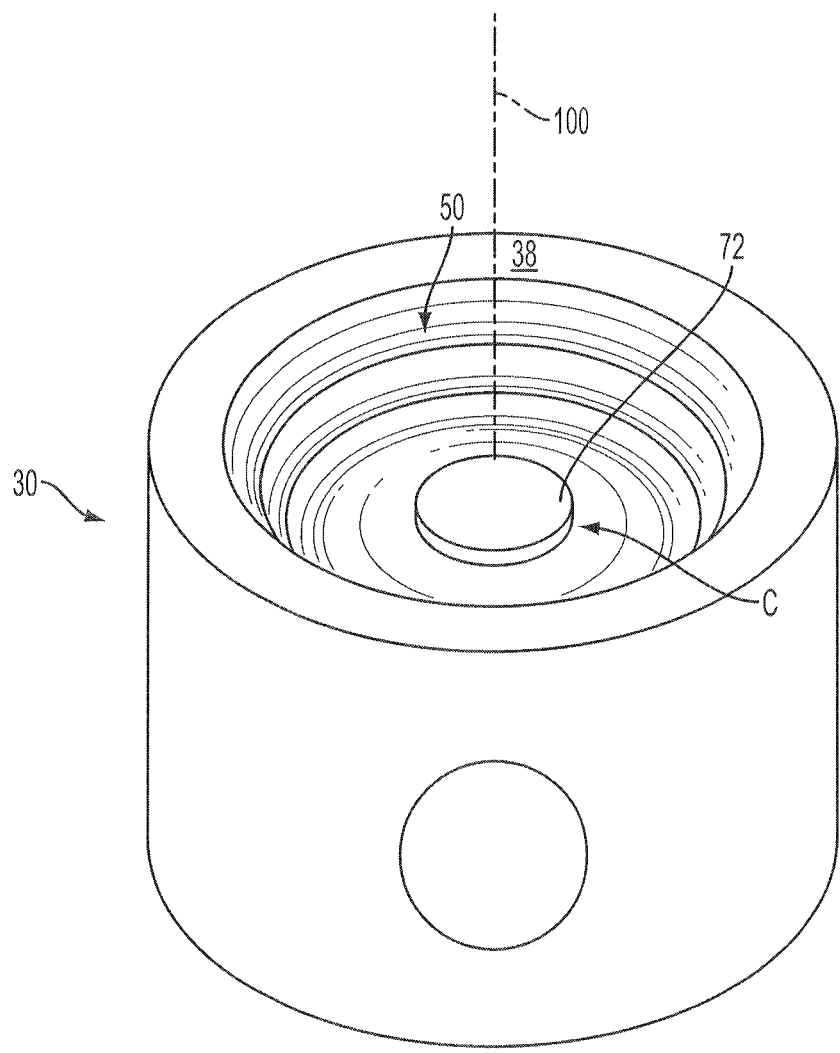
FIG. 2 is a perspective view of the piston of FIG. 1 showing an exemplary bowl shape and an exemplary surface feature disposed on the dome of the bowl.

FIG. 2 is a perspective view of the piston 30 of FIG. 1 showing an exemplary bowl shape 50 and an exemplary surface feature 72 disposed on the dome C of the bowl. Such surface feature 72 may form a step or separation edge in the surface of the dome C and may be disposed around the centerline 100 of the dome to receive sprayed fuel from an injector (see FIG. 4). Such feature 72 may represent a target for the sprayed fuel 80 which may allow liquid fuel impingement during the initial portion of the injection and take advantage of the early fuel jet's significant momentum to redirect the fuel in a predetermined manner. The dome surface C within the feature 72 may be relatively flat or angled from the centerline 100 to the feature 72. While the dome C in FIG. 2 is depicted as flat inboard of the separation edge 72, the dome C may have an angled or conical surface as shown at C in FIGS. 3 and 3A, both inboard of the separation edge 72 and below the separation edge.

Figure 2A:
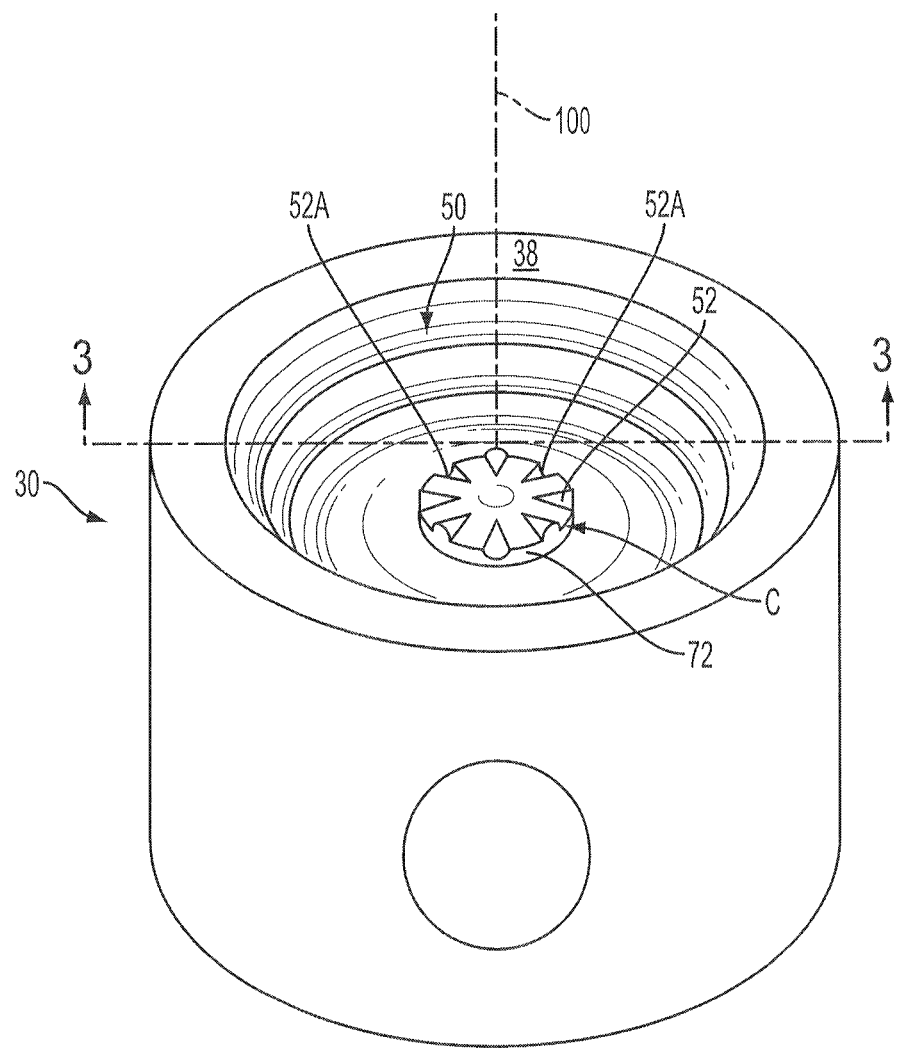
FIG. 2A is a perspective view of the piston of FIG. 2 showing an exemplary bowl shape and an exemplary additional surface feature disposed on the dome of the bowl.

FIG. 2A is a perspective view of the piston 30 of FIG. 2 showing an exemplary bowl shape 50 and an additional exemplary surface feature 52 disposed on the dome C of the bowl within the feature 72. Such surface features 52 may project from the surface of the dome C and may be disposed around the dome to receive sprayed fuel from an injector (see FIG. 4). Such features 52 may represent target spots for the sprayed fuel 80 which allow liquid fuel impingement during the initial portion of the injection and takes advantage of the early fuel jet's significant momentum to redirect the fuel in a predetermined manner. In other words, the sprayed fuel may deflect off the features 52 disposed on the piston dome C and be distributed above the bowl 50. This interaction of the spray 80 with the features 52 creates a zone of relatively high turbulence and relatively increased atomization of the fuel and air entrainment, leading to relatively faster burn rates and relatively lower soot production (see FIGS. 7-8).

It is contemplated that the discrete features 52 may be protruding from and or recessed into the dome surface C, as shown in FIG. 2A as feature 52A.

Figure 3:
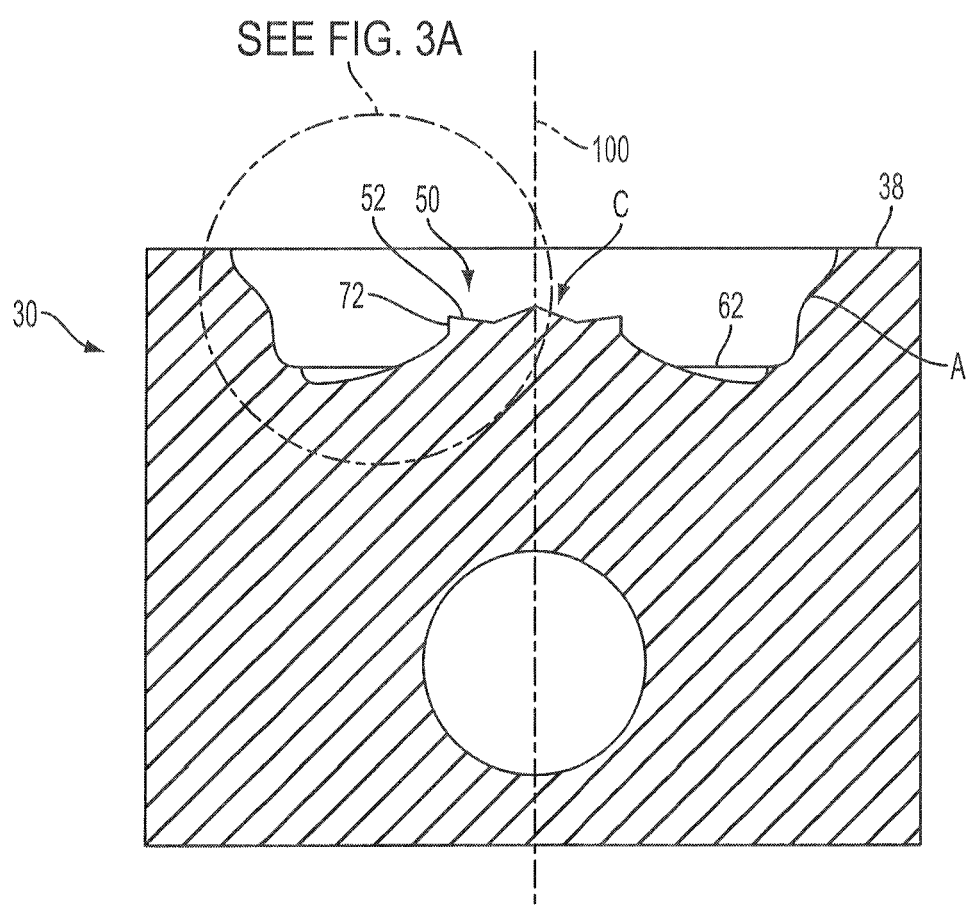
FIG. 3 is a cross-sectional view taken vertically through the center of the exemplary piston of FIG. 2A along line 3-3.

FIG. 3 is a cross-sectional view taken vertically through the center of the exemplary piston of FIG. 2A along line 3-3 and illustrates an exemplary curved inner wall A for the bowl 50 including a surface feature or separation edge 62 near the lowest point in the bowl 50 and disposed circumferentially within the bowl. These features are located on the moving piston, thus the angle and amount of deflection of the spray (see FIG. 4) may vary during the injection phase. The separation edge 72 on the dome C and the surface feature 62 in the bowl 50 and the edge 54 of the additional surface feature 52 (see FIG. 5A) may all have a radius of 0.1 mm to 1.5 mm, in any numerical increment such as in 0.01 mm increments. Accordingly, it may have a value of 0.1 mm, 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm etc. Preferably, the radius value may be in the range of 0.3 mm to 0.7 mm.

The separation edge 62 may be one that projects into the volume of the bowl or it may be recessed into an inner surface of the bowl. The feature 62 may be located along a portion of the surface of the bowl and may be a continuous or intermittent feature. The height and radius and location of the feature line may also be varied to effect wall wetting. The separation edge 72 and the surface feature 62 in the bowl may be concentric with the centerline 100 or may be offset relative to the centerline.

Figure 3A:
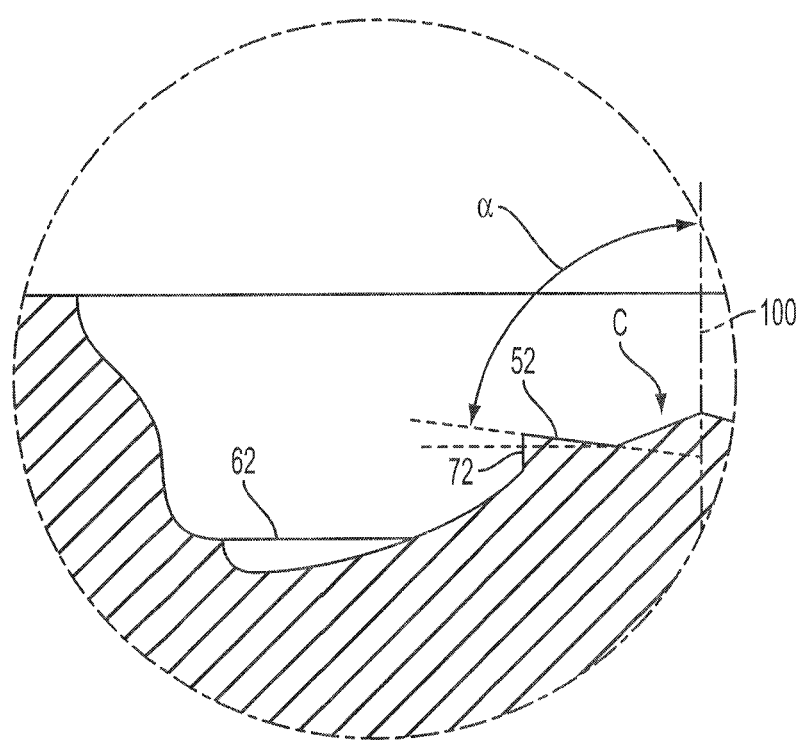
FIG. 3A is an enlarged cross-sectional view taken of the dome of the exemplary piston of FIG. 3.
Figure 4:
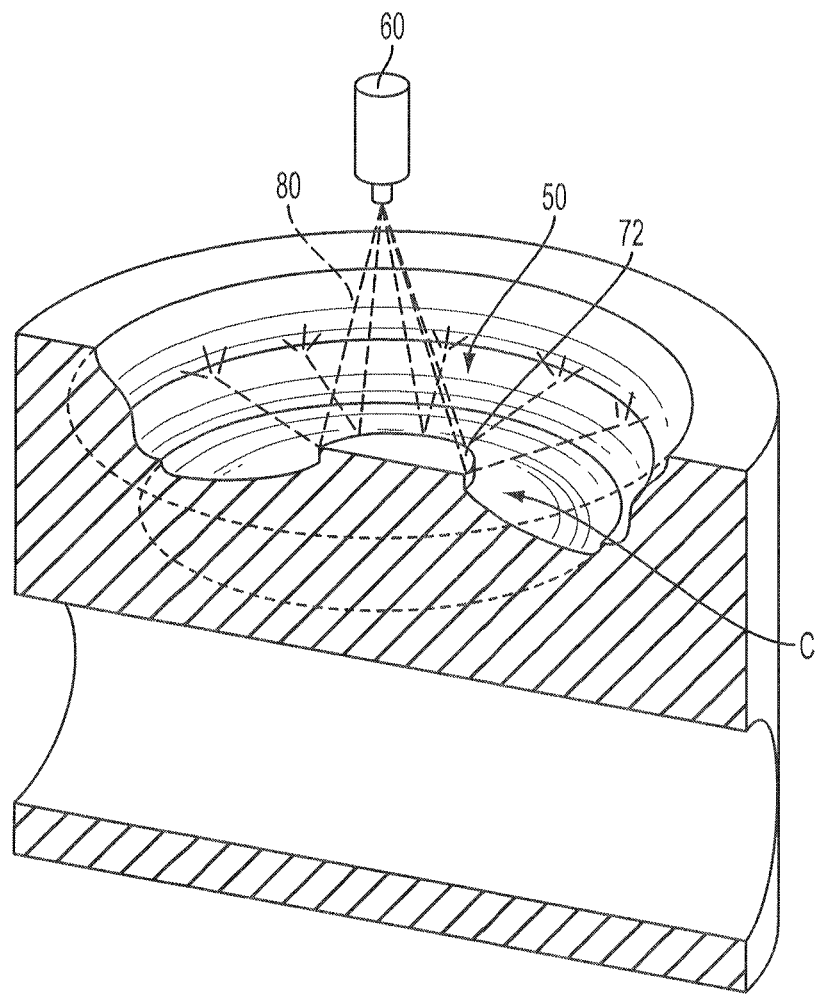
FIG. 4 illustrates a perspective view of a section of the bowl of FIG. 2 further including a central injector and an exemplary conical spray pattern of fuel.

As illustrated in FIG. 4 the spray pattern 80 may be in the shape of a cone radiating from an injector 60 mounted adjacent the centerline of the cylinder head 14 and targeting, during the various stages of injection, feature 72 on the surface of the dome C. In this view, the remainder of the bowl is shown in wire-frame to assist in understanding the invention. The dome may include additional surface features 52 (see FIG. 2A) and/or additional surface features 62 in the bowl 50 (see FIG. 3A) as targets for the spray 80.

The spray 80 may be deflected off and upwards relative to features 52, 62 and 72 and guided to a region that is relatively closer to the cylinder head, while also being spread sideways to increase the fuel—air mixing. In other words, the spray 80 may be primarily deflected to a location within the piston bowl that is above or below the surface of feature 72, depending upon injection timing. During another injection phase, the deflecting features 52, 72 may be moving away from and out of the spray plume, allowing the spray to impact on surface feature 62 at the outer bowl wall, controlling fuel jet flow in a region within the lower portion of the piston bowl 50. It may be appreciated that surface feature 62 is below feature 52 within the piston bowl.

Accordingly, this invention provides a technique for maintaining and utilizing the jet momentum to improve the mixing of fuel and air. Further, the impact geometry at the deflecting feature 52 uses the momentum to improve fuel-jet distribution so that adequate momentum is retained for separation of the fuel-air plume, late in injection, when the spray impacts the piston bottom area and feature 62. Additionally, design of the deflection features insures improved mixing and distribution of the fuel to best utilize the oxygen in the combustion chamber.

FIG. 3A is an enlarged view of the dome C of FIG. 3, more clearly illustrating the cross-section of feature 52 and the angle α of the top surface of the feature to the centerline 100.

The positioning, size and shape of the feature 52 may determine the timing, duration and amount of deflection of the spray. The deflection angle α sets the direction of the reflected spray (see FIG. 3A).

It is contemplated that the number of surface features 52 disposed on the surface of the dome C may be arranged symmetrically around that surface and number, for instance, 2, 3, 4, 5, 6, 7, 8, etc.

It is further contemplated that one or more surface features 52 may be arranged non-symmetrically around the surface of the dome C. That is, the features 52 may not be arranged in a regular repeating fashion around the dome. See FIG. 5 below.

Figure 6:
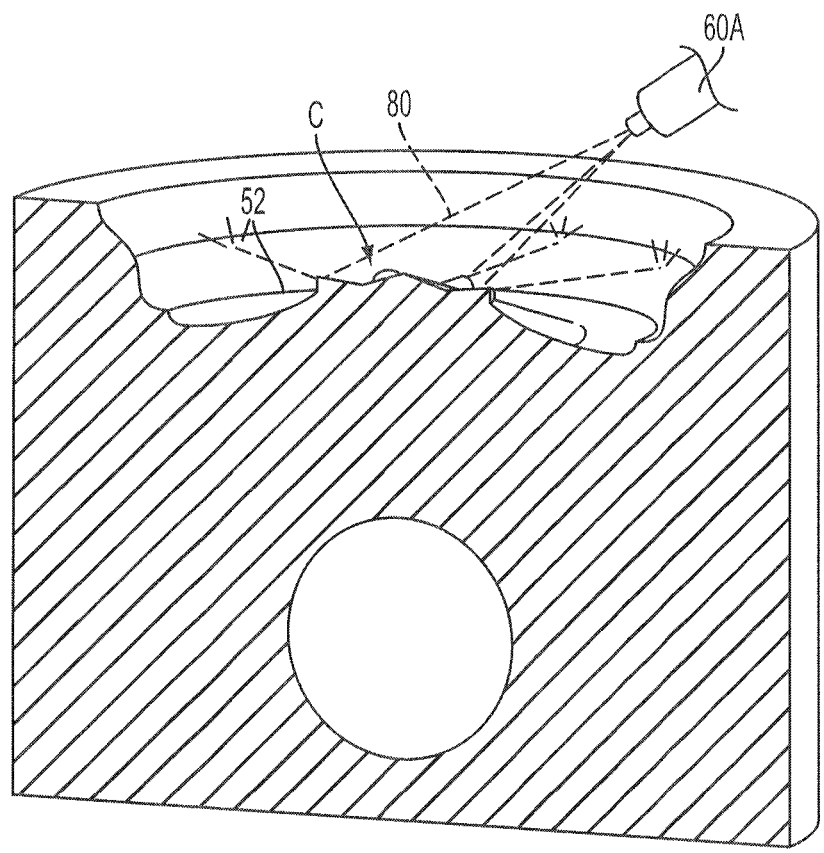
FIG. 6 illustrates another embodiment where an off-center injector sprays fuel at a surface feature in a bowl dome.

In addition, the features 52 may be the target of an injector nozzle 60A which is disposed at any other location that is not on the centerline of the cylinder head. See FIG. 6.

Figure 5:
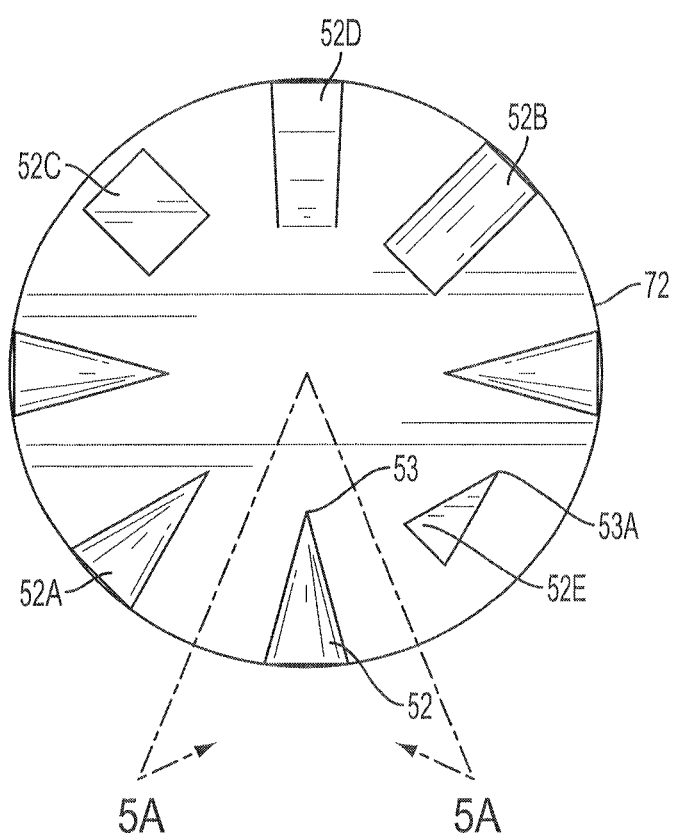
FIG. 5 is an enlarged top view of the central dome portion of the piston of FIG. 2 illustrating additional surface features of various shapes disposed on the surface of the central dome portion.

FIG. 5 is an enlarged top view of the central portion of the dome C of FIG. 2 bounded by separation edge 72 illustrating various shapes of additional surface feature 52 disposed above separation feature 72. In this view conical or triangular surface feature 52 is shown as having a pointed end 53 that is facing the centerline 100 of the piston bowl. Features 52B and 52C may have a cylindrical or rectangular shape, and again project from or be recessed into the surface of the dome. Feature 52D may be a ramp feature that projects from or is recessed into the surface of the dome and which has a surface that blends into the dome surface. Feature 52E may have a similar shape to 52 but has a pointed end 53A not facing the centerline. The surface features 52, 52A, 52B may generally be disposed adjacent an edge 72 at some distance from the centerline 100 of the bowl. While shown in FIG. 5 as all being included on a single piston dome, it is understood that one or more of surface features 52 and/or 52A and/or 52B and/or 52C and/or 52 D and/or 52E may be disposed on a piston dome.

Figure 5A:
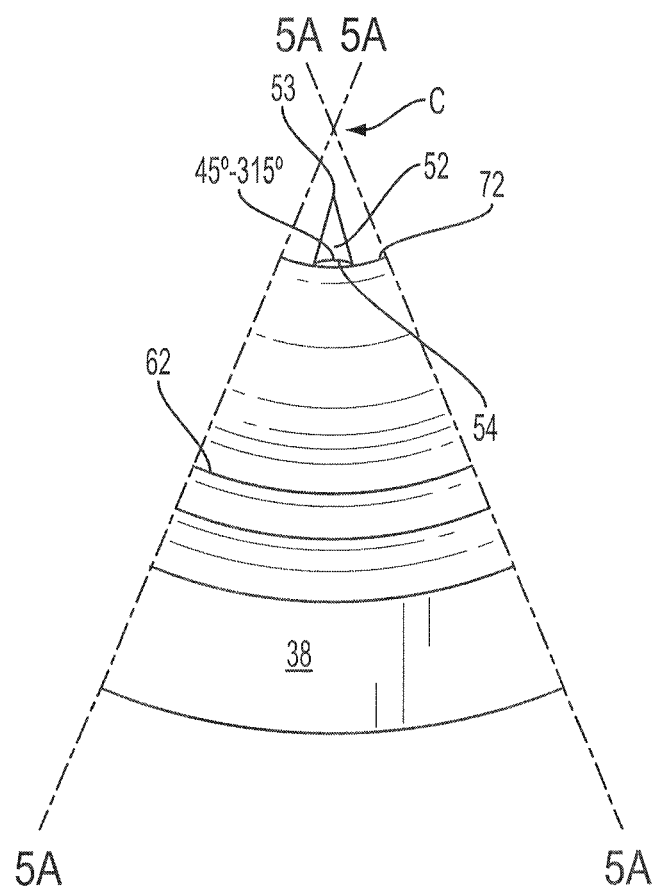
FIG. 5A is an enlarged view of a 45° slice of the piston of FIG. 5 including a portion of the bowl illustrating an enlarged view of an additional surface feature disposed on the surface of the dome.

FIG. 5A is an enlarged view of a 45° slice of the piston bowl dome of FIG. 5 illustrating a surface feature 52 disposed on the surface of the dome C and its' relationship to the bowl. The projecting feature 52 may be a generally pointed shape, for instance 3-sided, with an apex 53 (pointed end shape) facing the centerline of the bowl. The feature may have an angled upper surface, which surface tapers and slopes down toward the centerline (see FIG. 3A). Preferably the feature 52 is a portion of a cone where the end 54 that protrudes above separation edge 72 describes an arc of 45-315°. The angle α of the surface of feature 52 may be disposed at between 45-89° from the center line 100, preferably 55-75° (see FIG. 3A). It may also be appreciated that even in that situation where the surface feature has a convex shape, the angle α may still be measured by projecting a line along the surface of the convex shape as shown in FIG. 3A and again determining the angle α with respect to the centerline. Furthermore, it may be appreciated that when the feature 52 is a portion of a cone or a cylinder 52B or a rectangle 52C, it may not have an apex or pointed end shape facing the centerline of the bowl, and may be truncated or blend smoothly (see 52D in FIG. 5) into the dome surface.

It is contemplated that the feature 52 as well as the surface surrounded by edge 72 or the entire dome C may be formed of metals or of ceramic. It is further contemplated that the surface finish of the feature 52 or the surface surrounded by edge 72 may vary to further effect the deflection of the spray. The surface feature 52 may therefore comprise a material that is different from the material of the dome and be an additional feature to the separation feature 72. In such a case as where a portion of the dome C or surface features thereof (52-52E) comprise a material, such as ceramic, that is different from the material of the piston, it is contemplated that such a different material may be insulated from the piston to allow the material to have an operating temperature different from that of the remainder of the bowl.

It should be noted that the deflection of the spray off the piston dome that occurs at the first part of injection may more effectively distribute the fuel. The addition of a convex surface feature 52 disposed on the dome C may further increase this effect, depending upon injection timing. This then may lead to a relatively larger initial flame front, effectively using the oxygen in the inner top portion of the combustion chamber. When the fuel plume finally hits the outer bowl wall, the bowl nose A distributes the rest of the fuel. The effect of the radius of the deflection surface on indicated properties is clearly visible in the FIGS. 7 and 8 at varying crank angle.

Figure 7:
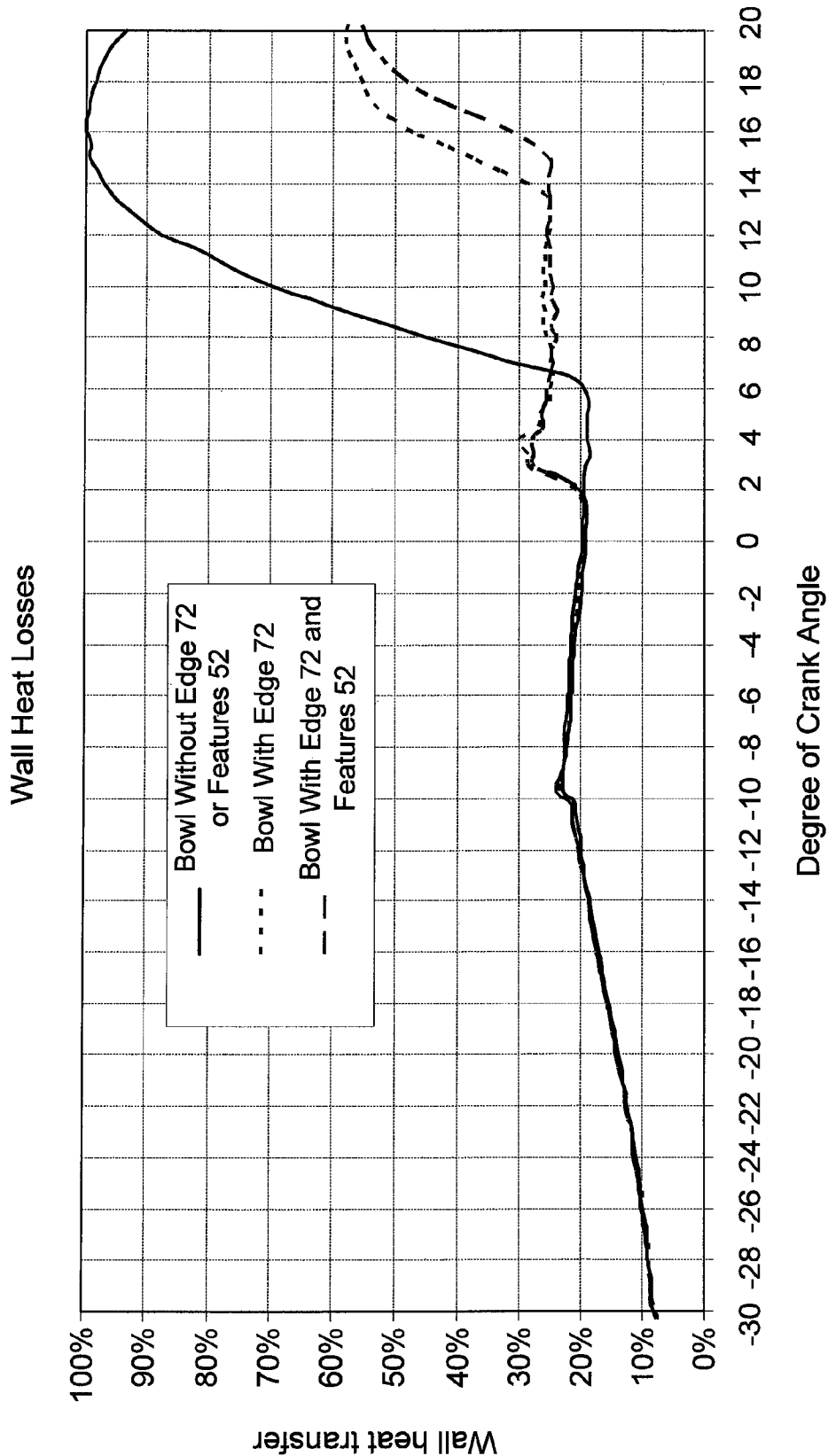
FIG. 7 is a plot of wall heat losses vs. crank angle for three different dome shapes.

Specifically, attention is directed to FIG. 7 which is a plot of wall heat losses vs. crank angle in degrees for three different dome shapes using CFD modeling. In each case, the bowl shape is as shown in cross-section in FIG. 3 with different geometries for the dome C. The baseline conditions for the plot (solid line) include the nose A and edge feature 62 with a smooth uninterrupted dome C. The dashed line represents the use of the same bowl features but adds a circumferential separation edge 72 about one third of the distance between the centerline 100 and the bottom of the bowl and surface features 52 disposed around the edge 72 (see FIGS. 3A and 5) and indicates a substantial reduction in wall heat losses for crank angles of 8-20°, compared to the baseline geometry. The dotted line represents the use of the same bowl features but only a circumferential separation edge 72 about one third of the distance between the centerline 100 and the bottom of the bowl and no surface features 52 disposed around the edge 72 and indicates a slight reduction in wall heat losses for crank angles of 15-20°, compared to the combination of edge and surface features (dashed line).

Figure 8:
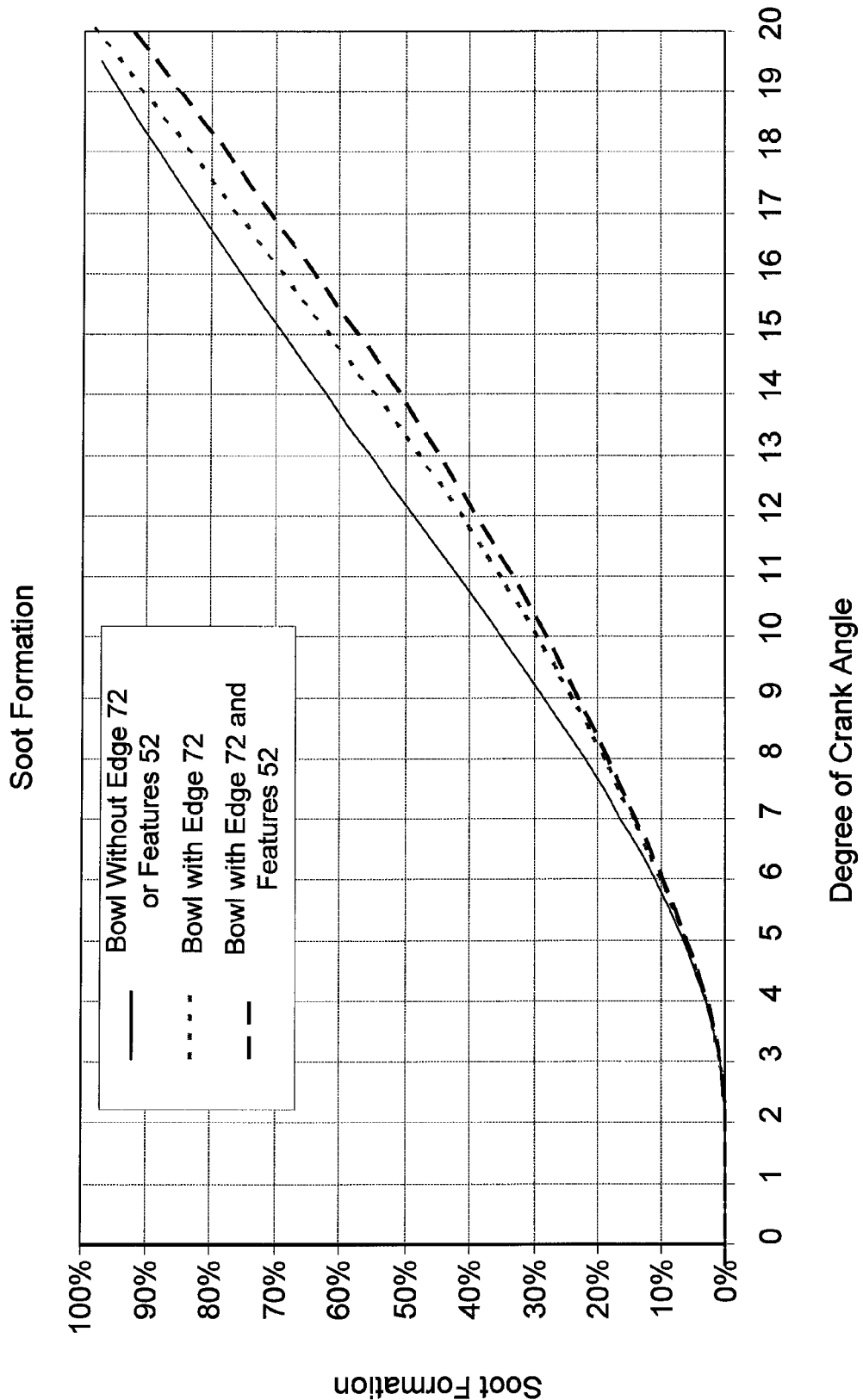
FIG. 8 is a plot of soot formation vs. crank angle for three different dome shapes.

FIG. 8 is a plot of soot formation vs. crank angle in degrees for the same three dome shapes as in FIG. 7. Note that the soot formation for pistons having the separation edge 72 only is lower than the baseline (solid line) without edge or surface features and that further reduction in soot formation is provided by the inclusion of surface features 52 along with the edge 72 for all crank angles from 6 to 20 degrees.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A piston for a direct injection engine, the piston comprising a bowl at an upper end, the bowl forming a portion of a combustion chamber, wherein the bowl has a centerline and an inner surface and a dome that defines a bowl volume configured to receive a fuel-air mixture, the dome having a surface that includes at least one separation feature having a separation edge on said dome surface arranged to deflect sprayed fuel to the inner surface of the bowl, where said separation feature is formed as a step in the surface of the dome, the step disposed around the centerline;
   wherein the dome further includes at least one additional feature, wherein the at least one additional feature projects from said dome surface; and
   wherein the additional feature defines a surface disposed at an angle of 45-89° from said centerline of said piston bowl which deflects sprayed fuel upwards towards the inner surface of the bowl.

2. The piston of claim 1 wherein said additional feature has a pointed end shape at one end, the pointed end shape facing the centerline of the bowl.

3. The piston of claim 1, wherein the inner surface of the bowl includes at least one surface feature that forms a target for said deflected fuel spray.

4. The piston of claim 1 wherein said at least one separation feature has a flat upper surface.

5. The piston of claim 2 wherein said at least one additional feature defines a portion of a cone and includes a surface having a convex shape.

6. The piston of claim 1 wherein said at least one additional feature is disposed along said separation edge on said dome.

7. The piston of claim 6 wherein said at least one additional feature comprises a portion of a cone that projects above said separation edge and describes an arc of 45-315°.

8. The piston of claim 1 wherein at least one of said at least one separation feature and said at least one additional feature comprise a material that is different from a material of the bowl.

9. The piston of claim 1 wherein said separation edge has a radius of 0.1 mm to 1.5 mm.

10. The piston of claim 3 wherein said at least one bowl surface feature is concentrically disposed in said bowl.

11. The piston of claim 3 wherein said at least one separation feature and said one bowl surface feature are configured to engage sequentially with said fuel spray.

12. The piston of claim 1 wherein at least two additional features are provided and are symmetrically disposed on said piston dome.

13. The piston of claim 1 wherein at least two additional features are provided and are asymmetrically disposed on said piston dome.

14. The piston of claim 1 wherein said additional feature is not symmetrical in shape.

15. The piston of claim 3 wherein said at least one bowl surface feature is recessed into the bowl volume.

16. A piston for a direct injection engine, the piston comprising a bowl at an upper end, the bowl forming a portion of a combustion chamber, wherein the bowl has a centerline and an inner surface and a dome that defines a bowl volume configured to receive a fuel-air mixture, the dome having a surface that includes at least one separation feature on said dome surface arranged to deflect sprayed fuel to the inner surface of the bowl, where said separation feature is formed as a step in the surface of the dome, the step disposed around the centreline; and
   wherein the dome further includes at least one additional feature, wherein the at least one additional feature projects from said dome surface and said at least one additional feature defines a portion of a cone and includes a surface having a convex shape; and
   wherein the additional feature defines a surface disposed at an angle of 45-89° from said centerline of said piston bowl which deflects sprayed fuel upwards towards the inner surface of the bowl.

17. A method of operating an internal combustion engine having at least one cylinder and a piston slidably disposed within the at least one cylinder, the method comprising:
   moving the piston toward a top dead center position during a compression stroke;
   spraying a fuel into a piston bowl recessed in said piston, wherein the bowl has a centerline and an inner surface and a dome that defines a bowl volume configured to receive a fuel-air mixture, the dome having a surface that includes at least one separation feature having a separation edge on said dome surface arranged to deflect sprayed fuel to the inner surface of the bowl, where said separation feature is formed as a step in the surface of the dome, the step disposed around the centerline,
   wherein the dome further includes at least one additional feature which projects from said dome surface,
   wherein the additional feature defines a surface disposed at an angle of 45-89° from said centerline of said piston bowl which deflects sprayed fuel upwards towards the inner surface of the bowl; and
   directing said sprayed fuel to impact said at least one separation feature and said additional feature;
   redirecting said fuel upon impact with at least one of said at least one separation feature and said at least one additional feature to a location within the piston bowl above at least one of said at least one separation feature and said at least one additional feature to provide mixing of the fuel with air in the cylinder.

* * * * *